United States Patent [19]

Etchell

[11] E Re. 30,718

[45] Reissued Aug. 25, 1981

[54] SADDLE LOCKUP FOR FLEXIBLE PRINTING PLATE

[75] Inventor: Gordon Etchell, Downers Grove, Ill.

[73] Assignee: Rockwell International Corporation, Pittsburgh, Pa.

[21] Appl. No.: 969,312

[22] Filed: Dec. 14, 1978

Related U.S. Patent Documents

Reissue of:

[64] Patent No.: 3,696,744
Issued: Oct. 10, 1972
Appl. No.: 80,426
Filed: Oct. 13, 1970

[51] Int. Cl.[3] ..... B41F 27/12

[52] U.S. Cl. ..... 101/415.1; 292/163; 292/252; 292/332

[58] Field of Search ..... 101/415.1, 378

[56] References Cited

U.S. PATENT DOCUMENTS

| | | | |
|---|---|---|---|
| 74,643 | 2/1868 | Warren | 130/7 |
| 836,534 | 11/1906 | Rainess | 24/155 BR |
| 975,620 | 11/1910 | Hutchinson et al. | 24/155 BR |
| 1,031,637 | 7/1912 | Fischer | 24/244 |
| 1,274,406 | 8/1918 | Frazier et al. | 285/376 |
| 1,346,341 | 7/1920 | Schinkez | 279/19.4 |
| 1,492,853 | 5/1924 | Johnson | 24/155 BR |
| 1,640,347 | 8/1927 | Chisholm | 101/415.1 |
| 1,741,969 | 12/1929 | Bellows | 81/177 D |
| 1,879,364 | 9/1932 | Lomar | 285/314 |
| 1,991,825 | 2/1935 | Strickland | 70/90 |
| 2,045,408 | 6/1936 | Read | 101/415.1 X |
| 2,135,223 | 11/1938 | Scheiwer | 285/96 |
| 2,161,703 | 6/1939 | Ellis et al. | 24/126 |
| 2,211,910 | 8/1940 | Read | 101/415.1 X |
| 2,377,812 | 6/1945 | Scheiwer | 285/169 |
| 2,470,256 | 5/1949 | McIlroy | 285/168 |
| 2,501,581 | 3/1950 | Rieger | 16/143 |
| 2,512,940 | 6/1950 | Janke | 101/415.1 |
| 2,599,660 | 6/1952 | Poutinen | 70/457 |
| 2,693,980 | 11/1954 | Heidman, Jr. | 294/83 |
| 2,720,663 | 10/1955 | Bloomfield | 9/9 |
| 2,776,015 | 1/1957 | Bielstein | 166/188 |
| 2,816,471 | 12/1957 | Bachman | 85/5 |
| 2,825,112 | 3/1958 | Frieder et al. | 24/239 |
| 2,854,274 | 9/1958 | Gordon | 292/252 |
| 2,901,804 | 9/1959 | Williams | 24/211 |
| 3,014,745 | 12/1961 | Kytta | 292/252 |
| 3,015,867 | 1/1962 | Bronstein et al. | 24/123 |
| 3,033,016 | 5/1962 | Moberg | 70/395 |
| 3,037,256 | 6/1962 | Chapman | 24/211 |
| 3,046,827 | 7/1962 | Myers | 85/5 |
| 3,052,940 | 9/1962 | Sellers | 24/211 |
| 3,094,345 | 6/1963 | Gaylord . | |
| 3,186,196 | 6/1965 | Moberg | 292/252 X |
| 3,188,952 | 6/1965 | Miller | 101/415.1 |
| 3,218,970 | 11/1965 | Heimlicher et al. | 101/378 |
| 3,219,228 | 11/1965 | Sorensen | 220/46 |
| 3,233,496 | 2/1966 | DePew et al. | 85/5 |
| 3,252,721 | 5/1966 | Weasler . | |
| 3,290,960 | 12/1966 | McCay, Jr. | 74/527 |
| 3,298,666 | 1/1967 | Prange | 254/105 |
| 3,335,663 | 8/1967 | Harenza | 101/415.1 |
| 3,359,899 | 12/1967 | Luehrs | 101/415.1 |
| 3,386,138 | 6/1968 | Overman | 24/211 |
| 3,392,987 | 7/1968 | Muller et al. | 280/91 |
| 3,405,839 | 10/1968 | Saarem | 220/46 |
| 3,408,933 | 11/1968 | Hermach et al. | 101/415.1 |
| 3,416,447 | 12/1968 | Pozniak | 101/415.1 |
| 3,430,305 | 3/1969 | Geffner | 24/211 |
| 3,470,817 | 10/1969 | Heimlicher et al. | 101/378 |
| 3,533,355 | 10/1970 | Wall | 101/415.1 |
| 3,537,395 | 11/1970 | Prince et al. | 101/378 |
| 3,570,284 | 3/1971 | Hendricks | 70/58 |
| 3,603,255 | 9/1971 | Horner | 101/415.1 X |
| 3,608,487 | 9/1971 | Luemrs | 101/415.1 |
| 3,608,962 | 9/1971 | Knecht | 297/385 |
| 3,617,081 | 11/1971 | Drucker | 292/252 |
| 3,623,194 | 11/1971 | Claeson et al. | 24/211 N |
| 3,625,151 | 12/1971 | Hart | 101/415.1 |
| 3,646,866 | 3/1972 | Baltazzi et al. | 355/15 |
| 3,670,646 | 6/1972 | Welch, Jr. | 101/382 MV |
| 3,702,098 | 11/1972 | Eburn, Jr. | 101/415.1 |
| 3,715,981 | 2/1973 | Huffman | 101/415.1 |
| 3,793,685 | 2/1974 | Knecht | 24/230 AN |
| 3,912,138 | 10/1975 | Para | 224/10 |
| 3,914,965 | 10/1975 | Paxton | 70/34 |
| 3,980,327 | 9/1976 | Duran | 292/252 |
| 3,986,805 | 10/1976 | Haines | 425/242 R |
| 4,016,914 | 4/1977 | Zurko | 151/41.76 |
| 4,069,723 | 1/1978 | Payerle | 74/528 |

FOREIGN PATENT DOCUMENTS

| | | |
|---|---|---|
| 126160 | 3/1945 | Australia . |

| | | | |
|---|---|---|---|
| 294268 | 6/1966 | Australia . | |
| 824897 | 12/1951 | Fed. Rep. of Germany | 70/227 |
| 1211659 | 9/1966 | Fed. Rep. of Germany . | |
| 1561013 | 10/1969 | Fed. Rep. of Germany . | |
| 21246 | of 1909 | United Kingdom . | |
| 541859 | 12/1941 | United Kingdom . | |
| 932149 | 7/1963 | United Kingdom . | |
| 1102784 | 2/1968 | United Kingdom . | |

OTHER PUBLICATIONS

Chironis; "Machine Devices and Instrumentation," p. 173, 1966.

*Primary Examiner*—Clifford D. Crowder
*Attorney, Agent, or Firm*—LeBlanc, Nolan, Shur & Nies

[57] ABSTRACT

A curved saddle for supporting and tensioning a flexible printing plate which has a series of closely spaced apertures along opposite edge portions. Each end of the saddle is provided with a circumferentially moveable spring biased bar having a series of spaced lugs over which opposite ends of the appertured plate may be positioned and secured. To facilitate positioning of the plate over the bar lugs, each bar has a locking mechanism which secures the bar in a retracted position upon manually moving the bar to that position. After a plate is secured to the bar, the locking mechanism may be readily released by depressing an actuating plunger, thereby permitting the bar to be urged under the spring biasing force to an outwardly extended plate tensioning position.

15 Claims, 9 Drawing Figures

SADDLE LOCKUP FOR FLEXIBLE PRINTING PLATE

Matter enclosed in heavy brackets [ ] appears in the original patent but forms no part of this reissue specification; matter printed in italics indicates the additions made by reissue.

DESCRIPTION OF THE INVENTION

The present invention relates generally to printing, and more particularly to a curved saddle or holder to which a flexible printing plate may be attached and which in turn is capable of being mounted directly upon the press roll or cylinder of a rotary printing press, such as a high-speed newspaper printing press.

It is a principal object of the invention to provide a saddle having an improved means for reliably securing and tensioning a flexible wrap around type printing plate in proper operating position about the saddle.

Another object is to provide a saddle of the above kind in which the plate securing and tensioning means has a particularly simple construction and operation and is compactly mounted at the end of the saddle.

Other objects and advantages of the invention will become apparent upon reading the following detailed description and upon reference to the drawings, in which.

Figure 1:
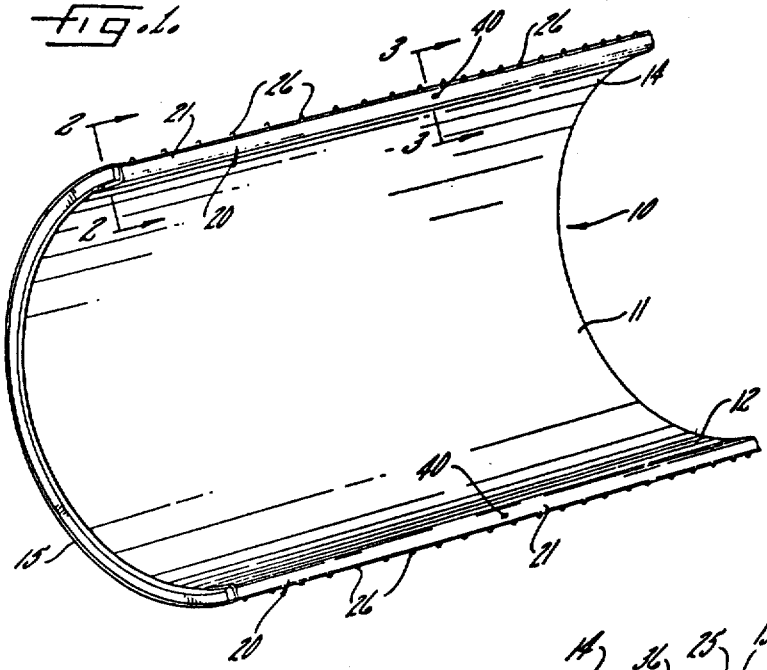
FIG. 1 is a perspective of a saddle embodying the present invention securing a flexible printing plate.
Figure 2:
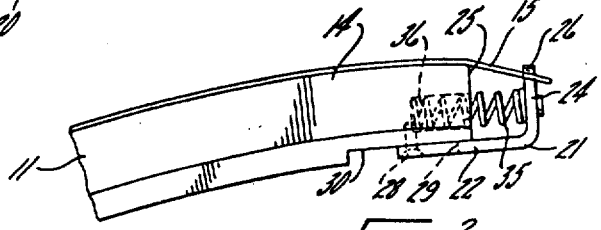
FIG. 2 is an enlarged view of one end of the saddle taken in the plane of line 2—2 in FIG. 1 showing the spring means for biasing the plate securing bar in a tensioning direction.
Figure 3:
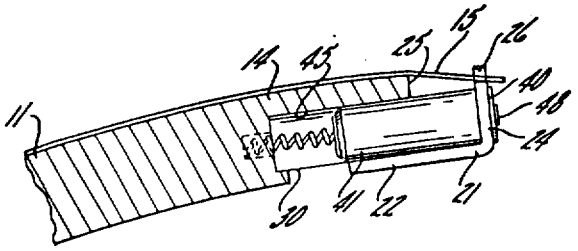
FIG. 3 is an enlarged fragmentary section taken in the line of 3—3 in FIG. 1 showing the bar locking mechanism.
Figure 4:
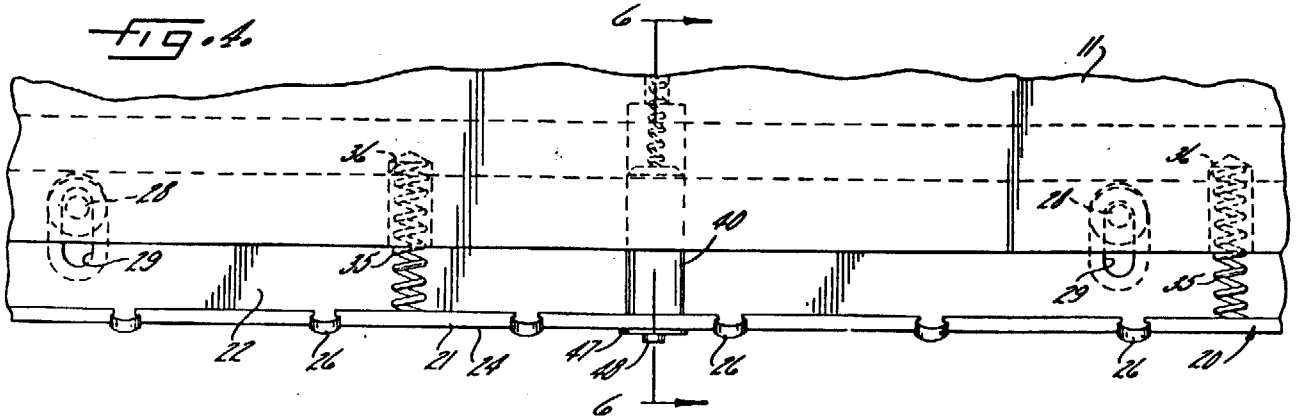
FIG. 4 is a fragmentary plane view showing an end of the saddle and the plate securing and tensioning means.

While the invention is susceptible of various modifications and alternative constructions certain illustrative embodiments thereof have been shown in the drawings and will be described below in detail. It should be understood, however, that there is no intention to limit the invention to the specific forms disclosed, but, on the contrary, the intention is to cover all modifications, alternative constructions, and equivalents falling within the scope and spirit of the invention.

Turning now to FIG. 1 of the drawings, there is shown an illustrative plate lockup device 10 embodying the present invention. The lockup device includes a curved saddle or backing member 11 having the general shape of a sector of a hollow cylinder. The saddle 11 is preferably formed of a strong, light metal, such as magnesium. The saddle has a leading end 12 and a trailing end 14 and is adapted to support a flexible printing plate 15 so that the combination may be directly mounted on the press roll or cylinder of a rotary printing press. The opposite end portions of the printing plate 15 are formed with a series of equally spaced appertures which facilitate their attachment to the saddle.

In accordance with the invention, an improved plate securing and tensioning means is provided for maintaining the flexible printing plate in proper operation position about the saddle. In the illustrated embodiment, identical plate securing and tensioning mechanisms 20 are provided at the leading and trailing ends of the saddle, each including a spring biased bar 21 mounted at the end of the saddle for circumferential movement relative to the saddle end. Since the illustrated mechanisms are similar, our discussion will be directed to the one at the trailing end 14 of the saddle. It will be understood, however, that the securing and tensioning mechanism of the present invention need only be provided at one end of the saddle, and other suitable securing means may be provided at the other end.

Figure 5:
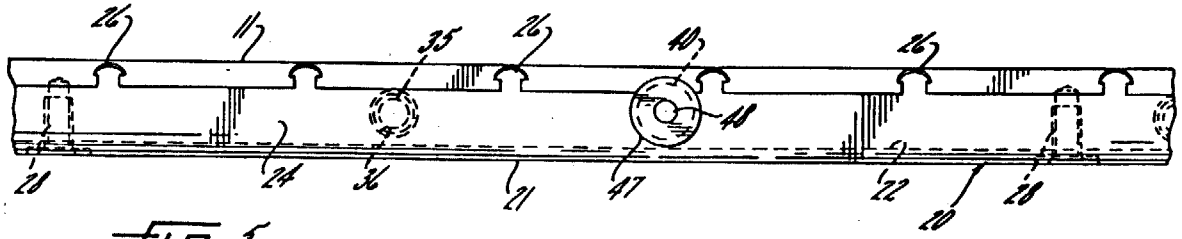
FIG. 5 is a partial end view of the saddle and plate securing and tensioning means shown in FIG. 4.

Referring now to FIGS. 2–9, the plate securing and tensioning mechanism is shown in detail. The bar 21 in this case has an L-shaped cross-section with one leg 22 positioned adjacent the underside of the saddle and another leg 24 extending radially outward and generally parallel to an end surface 25 of the saddle. The bar leg 24 is formed with a series of equally spaced lugs 26 over which an appertured end portion of the flexible plate 15 may be readily placed and secured. The lugs 26 are disposed below the outer plane of the saddle, as shown in FIG. 5. The bar leg 22 is slidably secured to the underside of the saddle by retaining screws 28 so that the bar may be moved toward or away from the saddle end in the circumferential plane of the saddle. To limit the range of movement of the bar 21, the leg 22 is formed with elongated slots 29 through which the retaining screws 28 are disposed. The underside of the saddle is relieved at 30 so that the bar leg 22 and screws 28 are below the plane of the underside surface and will not interfere when the saddle is mounted on a press cylinder.

The plate securing bar 21 is biased in a plate tensioning direction away from the saddle end by a plurality of compression springs 35 interposed between the bar leg 24 and the saddle end. In the illustrated case, one end of each spring is contained in a spring socket 36 formed in the end of said saddle and the other end of the spring bears against the bar leg 24. Thus, with the bar 21 mounted in this manner, it may be extended outwardly under the biasing force of the springs 35 to a plate tensioning position shown in FIG. 2 and may be manually moved to a retracted position shown in FIG. 7.

In keeping with the invention, means are provided for locking the plate securing bar in its retracted position and for readily releasing the bar to permit its movement under the spring biasing force toward the extended plate tensioning position. In the illustrated embodiment, a bar locking mechanism 40 is provided at the center of each bar 21. The locking mechanism 40 includes a ball carriage sleeve 41 containing a relatively moveable actuating plunger 42. The ball carriage sleeve 41 in this case is rigidly secured to the bar leg 24 by an appropriate press fit. The saddle end is formed with a socket 45 which slidably receives the ball carriage sleeve 41. A compression spring 46 interposed between the end of the plunger 42 and the end of the socket 45 biases the plunger 42 in an outward direction. The plunger 42 has a reduced diameter stem portion 48 which protrudes through the bar leg 24 and an end cap 47 so that the plunger may be moved inwardly against the force of the spring 46 by depressing the stem 48. The end cap 47 is secured to the bar leg 24 by suitable fastening means such as the spot weldments 49.

Interposed between the outer surface of the actuating plunger 42 and the walls of the socket 45 are a plurality of balls 50. The ball carriage sleeve 41 is formed with appertures 51 within which the balls 50 are carried as will be described below. In addition, the socket 45 includes a recessed groove 52 adapted to receive the balls 50 when the bar 21 and ball carriage sleeve 41 are in a retracted position, and the plunger 42 is formed with a relieved section 54 capable of receiving and carrying the balls 50 past the groove 52 to permit the bar and ball carriage sleeve to move to an extended position. Preferably, the socket groove 52 is rectangular shaped and the plunger relieved section 54 has oppositely tapered sides 55 connected by a cylindrical central portion 56.

Figures 6, 7, 8, 9:
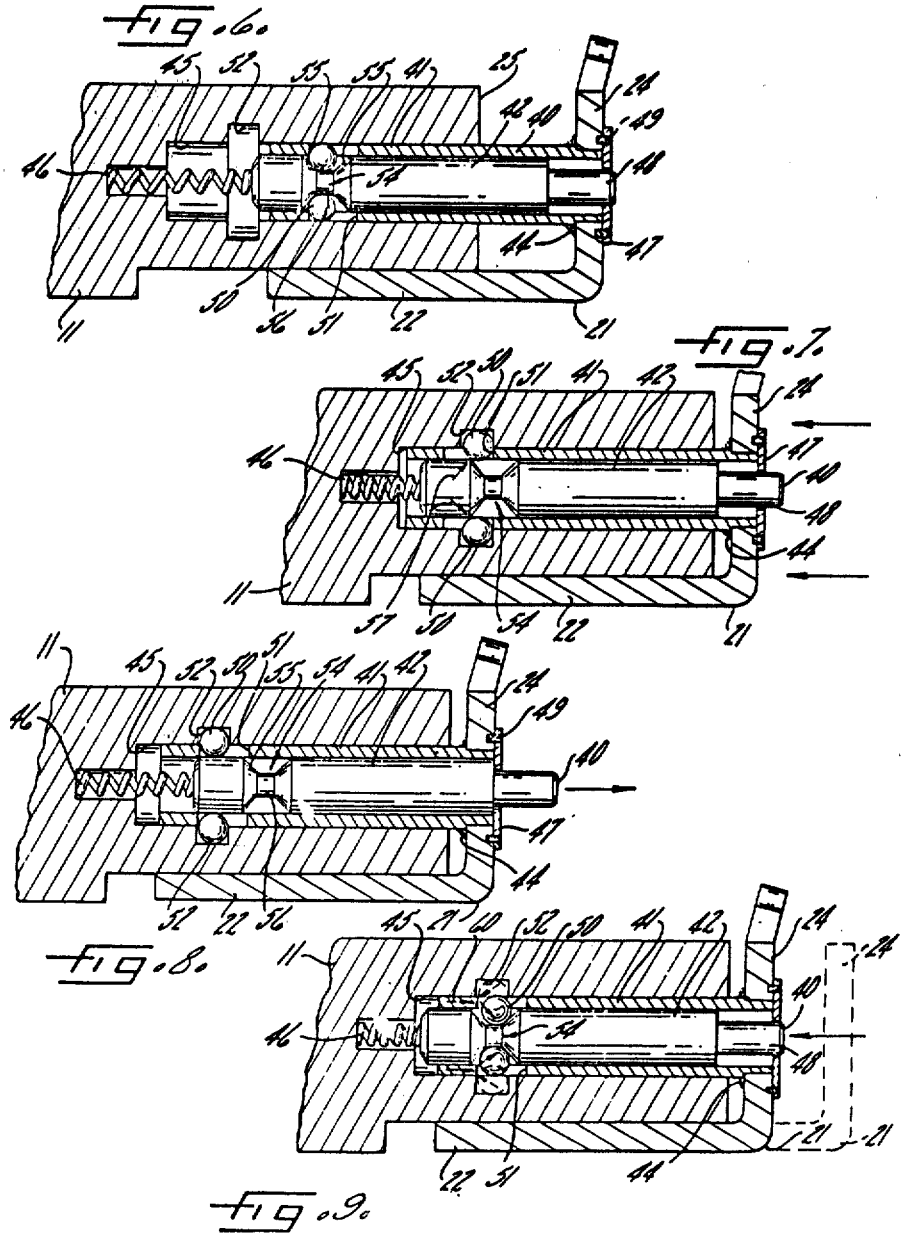
FIG. 6 is an enlarged fragmentary section taken in the plane of line 6—6 in FIG. 4 showing the bar locking mechanism when the bar is in an outer plate tensioning position.
FIG. 7 is a fragmentary section similar to FIG. 6 showing the locking mechanism as the bar is being moved to a retracted position.
FIG. 8 is a fragmentary section showing the locking mechanism when the bar is in the retracted position.
FIG. 9 is a fragmentary section showing the locking mechanism as it is releasing the bar for movement to its tensioning position shown in phantom and in FIG. 6.

The operation of the locking mechanism is best shown in FIGS. 6–9. When the bar 21 is in its outer plate tensioning position shown in FIG. 6, it can be seen that the plunger 42 is also in an extended position with the balls 50 located in the relieved plunger section 54. To lock the bar 21 in its retracted position, the bar is moved toward the saddle end. The ball carriage sleeve 41 bears upon the balls 50 and the balls in turn bear against the actuating plunger 42 causing the balls and plunger to be moved further into the socket. When the bar reaches its retracted position, the balls 50 are at the recessed socket groove 52 and are urged into the groove from the force of the spring 46 acting through the tapered side 55 of the plunger as shown by the force arrows 57 in FIG. 7. Once the balls are forced into the recessed grooves 52 the plunger 42 is then free to move outward past the balls as shown in FIG. 8, while the ball carriage sleeve 41 abuts against the balls locking the bar 21 in the retracted position. When the bar is held in the retracted position, the actuating plunger 42 is moved to an extended position under the force of its compression spring 46 with the plunger stem 48 extending out from the bar leg 24. To release the locking mechanism and permit the bar 21 to be moved toward its extended plate tensioning position under the force of the compression springs 35, the actuating plunger 42 is moved to the left as shown in FIG. 9 until the plunger relieved section 54 is at the ball position. At that point, with the sleeve 41 still being urged outwardly under the force of the compression springs 35, the balls are urged into the relieved section 54 of the plunger from the resultant of the reaction forces between the sleeve and balls as shown by the force arrows 60 in FIG. 9. When the balls are in the relieved sections 54, the plunger 42 and sleeve 41 may be returned to the FIG. 6 extended position under the force of the springs 35 and 46.

In the preferred arrangement the distance between the outer surface of the plunger 42 and the bottom of the recessed groove 52 should equal approximately the diameter of the ball 50, as should the distance between the bottom of the relieved section 54 and the socket wall 45. Preferably, the depth of the relieved plunger section 54, the depth of the recessed groove 52, and the thickness of the sleeve 41 should each equal approximately one-half the diameter of the ball 50. These dimensions permit the balls to easily move within the socket 45 when contained in the relieved plunger section 54 and also allow the plunger 42 to move past the balls when they are held in the recessed socket groove 52.

In view of the foregoing, it can be seen that the plate securing and tensioning bar and its associated locking mechanism facilitates quick mounting and tensioning of a flexible printing plate about the saddle. To initially secure the printing plate, each bar 21 is manually moved to its retracted position and is retained there by the locking mechanism 40 while the appertured end of the plate 15 is positioned over the spaced bar lugs 26. When both ends of the printing plate 15 are secured, the locking mechanism 40 of one bar 21, generally the trailing end of the saddle, may be released by merely depressing the plunger stem 48, thereby permitting the bar 21 to be urged under the spring biasing force to an extended plate tensioning position. To remove a plate from the saddle after it has been used, the bar may again be moved to its retracted position where it is secured by the locking mechanism.

It will be appreciated that the plate securing and tensioning bar and the locking mechanism of the present invention have a simple construction and operation and do not require the use of adjusting screws or other cumbersome mechanisms in securing or tensioning the plate. While a single locking mechanism 40 is shown in the illustrated embodiment for retaining each plate securing bar 21, it is understood that a number of such locking mechanisms may be used on each bar. This may be particularly useful on wide saddles to achieve a more uniform retention of the bar.

I claim as my invention:

1. A device for mounting a flexible printing plate to a press plate cylinder, comprising a curved saddle for supporting said plate about its outer surface, said saddle having the general shape of a sector of a hollow cylinder and having two straight ends, means at one end of said saddle for securing one end portion of said printing plate, a bar mounted at the other end of said saddle for movement toward and away from said saddle end, means on said bar for securing the other end portion of said printing plate, spring means interposed between said bar and saddle biasing said bar in a direction away from said saddle, means for locking said bar in a retracted position in close proximity to said saddle end, said locking means including an actuating plunger slidably disposed within said saddle end for axial movement in a circumferential direction relative to said saddle end, and means responsive to axial movement of said actuating plunger inward towards said saddle end for releasing said bar from said locking means to permit the bar to be moved outward away from said saddle end by the force of said spring means to tension the plate about said saddle.

2. The mounting device of claim 1 in which said locking means is operable to secure said bar in its retracted position in response to moving said bar to said position.

3. The mounting device of claim 2 in which said bar has an L-shaped cross section with one leg of said L being slidably mounted adjacent the underside of said saddle and the other leg of said L extending parallel to the end of said saddle, said other leg having a series of spaced lugs and said plate end portion secured by said bar being formed with a series of correspondingly spaced apertures which permit said plate to be hooked over said lugs.

4. The mounting device of claim 2 in which the said saddle end is formed with a socket within which said actuating plunger is disposed, said locking means including at least one ball element interposed between the outer surface of the actuating plunger and the socket walls, said socket having a recessed groove which receives said ball element when said bar is moved to the retracted position, an [abuttment] *abutment* means associated with said bar engaging said ball element when the ball element is disposed in said groove to prevent outward movement of said bar, said plunger having a relieved section into which said ball element is received when said plunger is moved inward to a determined position so as to permit said ball element and said [abuttment] *abutment* means to move beyond said recessed groove and allow said bar to move away from said saddle end.

5. The mounting device of claim 2 in which a ball carriage sleeve is secured to said bar, said actuating plunger being slidably supported within said sleeve, said saddle end being formed with a socket within which said ball carrying sleeve is slidably disposed, a spring interposed between the end of said actuating plunger and the end of said socket, at least one ball element interposed between the outer surface of the actuating plunger and the socket wall, said ball carriage sleeve having an aperture within which said ball element is carried, said socket having a recessed groove which receives said ball element when said bar is moved to its retracted position, said ball carrying sleeve bearing against a portion of said ball element when the ball element is disposed in said groove to prevent outward movement of said ball carriage sleeve and bar, said plunger having a relieved section which receives said ball element when said plunger is moved inward to a determined position, said ball element being free to move past said recessed groove when located in said actuating plunger relieved section thereby permitting the ball carriage sleeve and bar to be moved outward under the force of said spring means.

6. The mounting device of claim 4 in which said actuating plunger relieved section has oppositely tapered sides.

7. The mounting device of claim 5 in which the distance between the outer surface of said actuating plunger and the bottom of said recessed groove is approximately the diameter of said ball element and the distance between the bottom of the plunger relieved section and the socket walls is approximately the diameter of said ball element, and the depths of said recessed groove, the depth of said relieved section, and the thickness of said ball carriage sleeve each are approximately one-half the diameter of said ball element.

8. The mounting device of claim 4 in which said actuating plunger has a stem portion which extends through said bar to facilitate moving said plunger to its inward position.

9. A device for mounting a flexible printing plate to a press plate cylinder, comprising a curved saddle for supporting said plate about its outer surface, said saddle having the general shape of a sector of a hollow cylinder and having two straight ends, means at one end of said saddle for securing one end portion of said printing plate, an L-shaped bar mounted at the other end of said saddle for movement in a circumferential direction toward and away from said saddle end, said L-shaped bar having one leg slidably mounted adjacent the underside of said saddle and the other leg extending generally parallel to said saddle end, means on said other bar leg for securing the other end portion of said printing plate, spring means interposed between said other bar leg and saddle biasing said bar in a direction away from said saddle end, means responsive to retracting of said first bar leg to a predetermined position in close proximity to said saddle end for locking said bar in said retracted position, and means for selectively releasing said bar locking means to permit the bar to be moved in a direction away from said saddle end by the force of said spring means to tension said plate about said saddle.

10. The mounting device of claim 9 in which said other bar leg has elongated slots and is slidably mounted to said saddle by fastening means passing through said slots, said elongated slots defining the range of bar movement in the circumferential direction.

*11. A device for mounting a flexible printing plate to a press plate cylinder comprising a curved saddle adapted to be conformably mounted on said cylinder and having the general shape of a sector of a hollow cylinder and having side edges and circumferentially spaced opposite end edges extending radially of said cylinder, means at one end edge of said saddle for securing one end portion of said printing plate, a bar extending along the other end edge of said saddle between said side edges of said saddle and having means for attachment thereto of the other end of said plate, said bar having a portion accessible for manual actuation, combined mounting and locking means positioned between said side edges of said saddle and substantially wholly within said other end edge of said saddle for mounting said bar for movement in a direction substantially circumferentially of said saddle between an inner plate release position adjacent said other end edge of said saddle and an outer plate tensioning position displaced from said other end edge of said saddle and for selectively locking said bar in said plate release position, and spring means carried by said other end edge of said saddle biasing said bar toward said plate tensioning position; said combined mounting and locking means comprising a sleeve rigid with said bar and slidably received in a bore in said other end edge of said saddle and locking means carried by said sleeve effective upon manual displacement of said bar inwardly to said plate release position for locking said bar in said plate release position, said locking means including a plunger slidably mounted in said sleeve and having an externally manually accessible operating portion extending through said bar, said plunger being effective, upon manual displacement axially inwardly of said sleeve, to release said locking means to permit the bar to be moved outwardly away from said other end edge of said saddle under the influence of said spring means to said plate tensioning position, and means for positively limiting movement of said bar away from said other end edge of said saddle.*

*12. The device defined in claim 11, wherein there is a slidable connection between the bar and saddle disposed radially inwardly of the printing plate contacting outer periphery of said saddle, and said means for limiting outward movement of the bar is in said connection.*

*13. The device defined in claim 11, wherein there is a slidable connection between said bar and the saddle comprising a leg on the bar extending within a recess in said other end edge of the saddle, and said means for limiting outward movement of the bar is provided in said connection.*

*14. The device defined in claim 11, wherein said bar mounting means comprises a recess extending along said other end edge of the saddle and a leg on said bar projecting slidably into said recess, and said means for limiting*

*outward movement of the bar comprises cooperating guide pin and slot means on said saddle and said leg.*

*15. A device for mounting a flexible printing plate to a press plate cylinder comprising:*

*(1) a curved saddle adapted to be conformably mounted on the cylinder, said saddle having:*

*(a) the general shape of a sector of a hollow cylinder,*

*(b) side edges and*

*(c) circumferentially spaced opposite end edges extending radially of the cylinder;*

*(2) means at one end edge of said saddle for securing one end of the printing plate;*

*(3) a bar mounted on said saddle for limited movement in a substantially circumferential direction toward and away from the other end edge of said saddle and having means to secure the other end of said plate thereto;*

*(4) spring means interposed between said bar and said other saddle end biasing said bar in a direction away from said other saddle end; and*

*(5) combined locking and releasing means positioned between said side edges of said saddle and wholly within said other end edge of said saddle for selectively*

*positioning said bar between a locked inner plate release position adjacent said other end edge of said saddle and an outer plate tensioning position displaced from said other end edge of said saddle; said combined locking and releasing means comprising:*

*(a) a sleeve rigid with said bar and having an inner end slidably received within a bore in said other end edge of said saddle,*

*(b) a plunger slidably mounted in said sleeve and having an externally accessible operating portion extending through said bar, and*

*(c) locking means carried by said sleeve and said plunger inner ends,*

*(d) said locking means being effective to lock said bar in a plate release position adjacent said other end edge upon movement of said bar toward said other end edge and being effective upon displacement of said plunger toward said other end edge to release and permit said bar to be moved outwardly away from said other end edge of said saddle by said spring means to the plate tensioning position.*

* * * * *